United States Patent [19]

Cassani

[11] Patent Number: 4,859,817

[45] Date of Patent: Aug. 22, 1989

[54] FEELER FOR OMNIDIRECTIONAL CONTACTOR SYSTEM

[75] Inventor: Alexandre Cassani, Lausanne, Switzerland

[73] Assignee: Tesa S.A., Renens, Switzerland

[21] Appl. No.: 244,073

[22] Filed: Sep. 13, 1988

[30] Foreign Application Priority Data

Sep. 15, 1987 [CH] Switzerland ............... 03556/87

[51] Int. Cl.[4] ................. H01H 3/00; G01B 7/02
[52] U.S. Cl. .................... 200/61.41; 33/561; 200/61.42
[58] Field of Search ............ 200/61.41, 61.42; 33/559, 561, 169 R, 556; 73/651, 813

[56] References Cited

U.S. PATENT DOCUMENTS

| | | | |
|---|---|---|---|
| 3,906,783 | 9/1975 | Schumacher | 73/813 X |
| 4,138,823 | 2/1979 | McMurtry | 33/561 |
| 4,155,171 | 5/1979 | McMurtry | 33/561 |
| 4,159,429 | 6/1979 | Migliardi et al. | 200/61.41 X |
| 4,270,275 | 6/1981 | McMurtry | 33/561 |
| 4,279,080 | 7/1981 | Nayaka | 33/561 |
| 4,301,338 | 11/1981 | McMurtry | 200/61.41 |
| 4,516,327 | 5/1985 | Kanda et al. | 33/556 |
| 4,679,332 | 7/1987 | Luthi | 33/559 |

OTHER PUBLICATIONS

Metrologie Generale, M. Bassiere et al., 1966, p. 399.

Primary Examiner—J. R. Scott
Attorney, Agent, or Firm—Anthony J. Casella; Gerald E. Hespos

[57] ABSTRACT

The feeler comprises a stationary support (1) and a movable support (4) provided with a tip (5), which are pressed against each other by a spring (21). The immobilizing of the movable support with respect to the stationary support is obtained by a system of connections with zero degree of freedom formed of four spherical positioning pieces (7 to 10) applied, by six contact points, to six inclined resting surfaces (15 to 20) with flat contact surface, two first pairs (15–16, 17–18) of which are convergent and arranged respectively under two first opposing positioning pieces (7, 8) and the last two of which (19, 20) are parallel and each arranged under one of the two other opposing positioning pieces (9–10). An electrical circuit is provided to detect any interruption of contact between at least one positioning piece and one resting piece signifying an encounter of the tip (5) with the object.

7 Claims, 2 Drawing Sheets

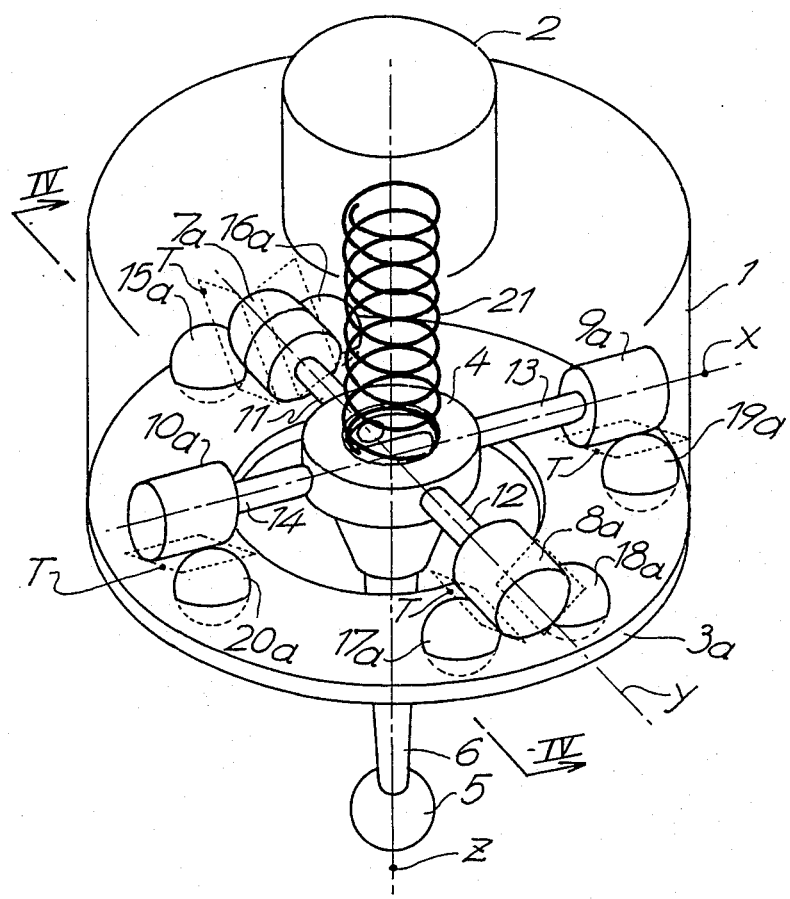
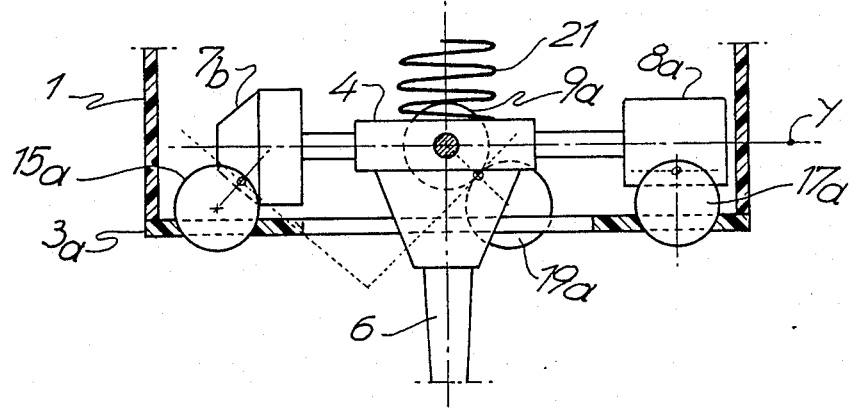

FEELER FOR OMNIDIRECTIONAL CONTACTOR SYSTEM

BACKGROUND OF THE INVENTION

The present invention has as its object a feeler for an omnidirectional system comprising two supports, one of which is stationary while the other is movable and provided with a tip, a device for the relative positioning of the supports placed between them, comprising a plurality of positioning pieces connected to one of the two supports and a plurality of resting pieces connected to the other support in order to define a position of relative immobilization of these two supports by six point contacts spaced apart over 360°, and a spring to assure the six point contact engagement by action on the movable support, the six point contacts determining six planes of tangency between the positioning pieces and the resting pieces which are arranged oblique and secant in space, the movable support being capable of being displaced against the action of the spring to cause an interruption of contact between at least one positioning piece and one resting piece, and means being provided to detect the contact interruption.

This feeler is intended to be used more particularly but not, however, exclusively on machines for the three-dimensional measurement of an object such as, for instance, a machined mechanical part or a mechanical part in the course of machining with reference to a measurement system with three rectangular coordinate axes.

On these machines, the stationary support of the feelers is integral with a displacement device associated with the measurement system and intended to bring the tip into contact with an element of the object to be measured,. The position of this stationary support is detected by means of detectors with reference to the three coordinate axes and calculated by a computer.

When the tip enters into contact with the element of the object to be measured, any subsequent displacement of the stationary support of the feeler, which does not fail to take place due to the inertia of the displacement device with which it is integral, has the effect of causing the displacement of the movable support of the feeler to which the tip is fastened against the action of the spring and thus produce an interruption of contact between at least one positioning piece and one resting piece of the relative positioning device placed between the two supports.

This contact interruption, detected on these measurement machines by electrical means which produce an interruption signal, is used primarily to trigger the taking of a measurement, that is to say the taking of data for the computer which makes it possible to store the relative position of the stationary support reached at that precise moment. On certain measurement machines the interruption signal thus produced also serves automatically to interrupt the displacement of the stationary support of the feeler when the latter is remote controlled.

With respect to the triggering of the taking of the measurement, it is obvious that the precision of the measurement made is dependent to a great extent on the rapidity and precision of response of the device for the relative positioning of the two supports of the feeler. It is important, in particular, that this response be assured in all azimuths by the fact that on the machines the measurement is carried out in three dimensions by displacement of the stationary support in the directions of the three coordinate axes and even in certain recent designs by random displacements in the plane of two of these three axes.

In order assure this all-aximuth response, the designers use various systems known from metrology and, in particular, for some of them, the guidance systems of zero degree of freedom which make it possible to assure the relative immobilizing of the two parts by six contact points between them, such as the hole-line-plane fitting of Lord Kelvin or the Boys support which consists in resting three spherical feet of one part in three V-shaped grooves arranged in the shape of a star on the other part.

In this last system of immobilization in accordance with Boys, the walls of the three V-shaped grooves of the one part represent, at the six points of contact with the spherical feet of the other part, six oblique planes of tangency which are secant in space, distributed in pairs of two convergent planes 120° from each other.

An example of the application of this immobilization system to a device for relative positioning between two supports of a feeler of a machine for three dimensional measurement is illustrated in U.S. Patent No. 4,270,275.

In a feeler structure described in that patent, six coplanar spherical resting pieces are arranged in three pairs, spaced 120° apart, on a stationary support while three coplanar cylindrical positioning pieces are arranged in star shape 120° from each other on a movable support with which there is associated a tip the end of which is spherical. A spring is placed under pressure on the movable support in order to maintain the three cylindrical positioning pieces resting against the three pairs of spherical resting pieces by six points of contact, at the level of which there are thus determined six oblique planes of tangency which are convergent in pairs between resting pieces and positioning pieces.

This system, which is self-adjustable, gives the feeler a triangular resting surface, the optimum being the distribution of the positioning pieces 120° apart, forming a resting surface in the form of an equilateral triangle.

As a result, one approximates here the triangular characteristic of the resting surface of the feeler by a circle, minimizing the error of the method of least squares of a probability calculation.

In theory, it is obvious that the error introduced by this approximation could further be reduced by increasing the number of sides of the polygon of rest in order to arrive at a square resting surface. However, if one adds for this purpose a pair of resting pieces and a positioning piece to the known system, one obtains eight points of contact to assure the position of relative immobilization of the two supports, which makes the system hyperstatic and causes it to lose its self-adjustability feature.

SUMMARY OF THE INVENTION

The object of the invention is a feeler having six contact points between the resting pieces and positioning pieces of its two supports and in which the pieces are arranged in such a manner that the pieces form a square resting polygon so as to increase the precision of the response as compared with a triangular arrangement, without causing the feeler to lose its character of self-adjustability.

For this purpose, the feeler according to the invention, of the type described at the beginning of the specification, is characterized by the fact that the positioning device comprises four positioning pieces distributed in the form of a cross, in opposite pairs, on one of the two supports, and six resting pieces arranged on the other support in such a manner that four of the resting pieces are arranged respectively in pairs under two first positioning pieces and that the other two of them are arranged respectively as single units below the other two opposing positioning pieces. The six planes of tangency between positioning pieces and resting pieces are oriented in such a manner that when the two first opposing positioning pieces are in contact with the respective two pairs of resting pieces, the movable support can translate and pivot in combination in a first plane containing these first two opposing positioning pieces and pivot around them against the action of the spring until it reaches the position of relative immobilization of the two supports against the return action of the spring in which the other two opposing positioning pieces, in their turn, come into contact with the respective two resting pieces.

In this way, due to the cross-shaped arrangement of four positioning pieces, instead of three arranged 120° apart, and to the division of the six resting pieces into two opposite pairs and two opposing units, instead of their partitioning in three pairs as in a Boys support and in the prior art cited, it is possible to impart to the movable support, after it has been placed resting on four first contact points, the possibilities of displacement which are necessary and sufficient in order to enable it then also to come onto the last two points of contact without losing a single one of the first four.

This system is therefore both self-adjusting and arranged as a square and, in accordance with the method of least squares, its response is more precise than a triangular arrangement.

BRIEF DESCRIPTION OF THE DRAWINGS

The accompanying drawing shows, by way of example, two embodiments of the object of the invention as well as a variant of the second embodiment.

FIG. 3 is a diagrammatic overall view, in perspective, of the second embodiment.

FIG. 4 is a partial section through the variant of the second embodiment, seen along the line I—I of FIG. 3.

DETAILED DESCRIPTION OF THE PREFERRED EMBODIMENTS

Figure 1:
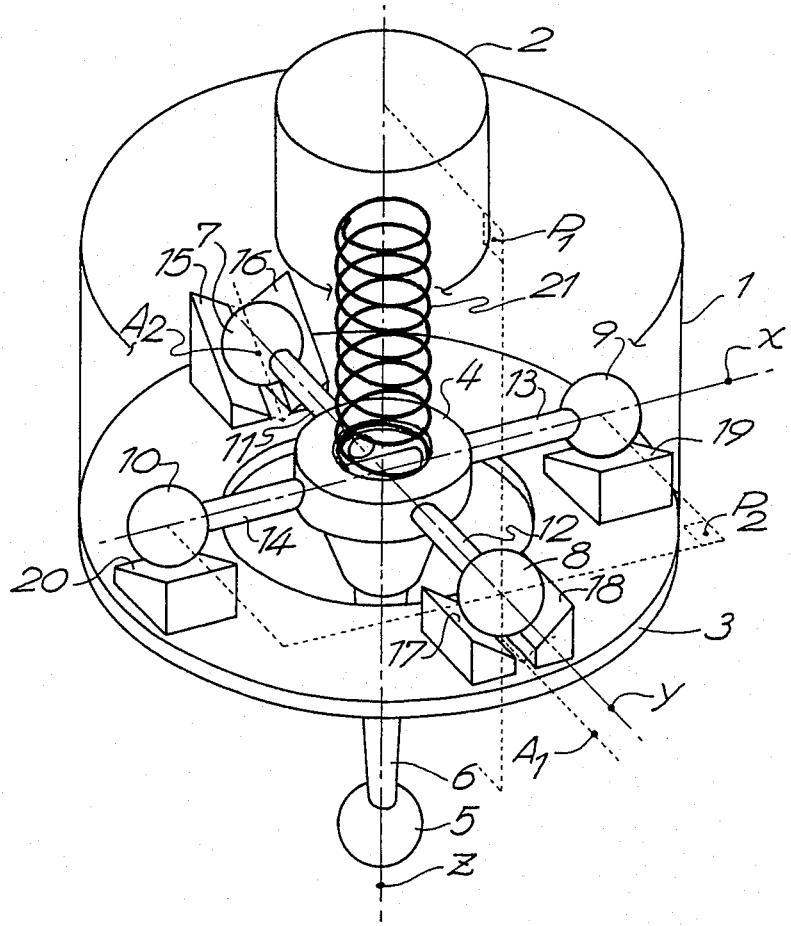
FIG. 1 is an overall diagrammatic view, in perspective, of the first embodiment.

In its two embodiments shown in FIGS. 1 and 3, the feeler is appropriate for the three-dimensional measuring of an object along three rectangular axes of coordinates, indicated here by the axes of revolution x, y and z of its main mechanical parts.

In the first embodiment, shown in FIG. 1, the feeler comprises a stationary support 1 in the form of a cylindrical housing surmounted by an attachment boss 2 provided with a thread (not shown) and having a bottom 3 in the form of a circular crown. A cylindrical movable support 4 is provided with a spherical measurement tip 5 centered on the axis z and borne on the end of an arm 6 extending from the bottom 3. A device for the relative positioning of supports 1 and 4 is located between the supports and comprises:

Four positioning pieces 7, 8, 9 and 10 with spherical contact surfaces, distributed in the shape of a cross 90° from each other at the end of four arms 11, 12, 13 and 14 with concurrent axes n and y which determine a plane $P_2$ perpendicular to the axis z and are integral with the movable support 4. These four positioning pieces are located two by two in opposition to each other with respect to the axis z.

Six resting pieces 15, 16, 17, 18, 19 and 20 with flat contact surfaces oblique with respect to the plane $P_2$ are fastened on the bottom 3 of the stationary support 1. The resting pieces are arranged in such a manner that four of the resting pieces 15, 16, 17 and 18 are arranged respectively in pairs 15-16, 17-18 on two first opposing positioning pieces 7 and 8. The other two resting pieces 19 and 20 are arranged respectively as single units below the other two opposing positioning pieces 9 and 10.

A compression spring 21 is interposed in compression between the movable support 4 and the boss 2 within the stationary support 1 in order to press the movable support 4 resiliently against the bottom 3 of the stationary support 1 via the positioning pieces 7-10 and resting pieces 15-20 of the positioning device placed between the movable support 4 and the bottom 3 of the stationary support 1 and assure a position of relative immobilization between the two supports by six point contacts between movable and stationary supports 4 and 1 respectively, spaced over 360° around the axis z, defined by the contact of the six resting pieces 15-20 with the four positioning pieces 7-10.

In this arrangement, the inclination of the flat contact surfaces of the six resting pieces 15 to 20 are oriented in such a manner that when the first two opposing positioning pieces 7 and 8 are in contact with the two respective pairs of resting pieces 15-16 and 17-18, the movable support 4 can translate and pivot in combination in a plane $P_1$ defined by the axes y and 2 and containing these first two positioning pieces. The movable support 4 is capable of pivoting around the axis of revolution y of the first two positioning pieces 7 and 8 in opposition to the compression spring. When the movable support 4 reaches the position of relative immobilization of the two supports under the return action of the spring, the two other opposing positioning pieces 9 and 10, in their turn, come into contact with the two respective resting pieces 19 and 20.

In this first embodiment, shown in FIG. 1, this operation is obtained by the fact that the six resting pieces 15 and 20 are arranged in such a manner that:

The flat contact surfaces of the two resting pieces of each of the first two pairs of the resting pieces 15-16 and 17-18 arranged below the first two opposing positioning pieces 7 and 8 are convergent and have their line of intersection inscribed in the first plane $P_1$. One of the lines $A_1$ of the two lines of intersection thus defined being parallel and the other line $A_2$ being oblique with respect to the second plane $P_2$.

The flat contact surfaces of the other two resting pieces 19 and 20 arranged below the other two positioning pieces 9 and 10 are parallel to each other and oblique with respect to the second plane $P_2$.

The line of intersection $A_2$ of the flat contact surfaces of the first two positioning pieces 15 and 16 which is oblique with respect to the second plane $P_2$ is secant in space to the plane of the parallel flat contact surfaces of the resting pieces 19 and 20.

Developed in this manner, the device for the relative positioning of the two supports 1 and 4 of the feeler constitutes, in position of rest, a connecting system with zero degree of freedom obtained by six contact points between the supports, and the device is self-adjustable.

Thus, when the movable support 4 is displaced in the direction of the axis of revolution y of the two positioning pieces 7 and 8 while maintaining its four points of contact with the resting pieces 15, 16, 17 and 18, the positioning piece 8 is displaced parallel to the bottom 3 of the stationary support 1 on the contact surfaces of the resting pieces 17 and 18 while the positioning piece 7 rises or descends with respect to the bottom 3 on the contact surfaces of the resting pieces 15 and 16. This displacement has the respective effects of moving the two positioning pieces 9 and 10 towards and away from the resting pieces 19 and 20. Furthermore, while the positioning pieces 9 and 10 are spaced from the contact surfaces of the resting pieces 19 and 20, the movable support 4 can also furthermore pivot around the axis y.

Similar reasoning can be employed by taking as four first contact points those pieces defined by the positioning pieces 8, 9 and 10 with the resting pieces 17, 18, 19 and 20. In this case, when the piece 8 is displaced along the axis y on the resting pieces 17 and 18, it is the piece 7 which moves towards or away from one of two resting pieces 15 and 16 by three degrees of freedom of movement, which in this case are rotation of the part 8 around the plane $P_2$ and a combined rotation and translation in the plane $P_1$.

The reverse of this latter reasoning is applicable in the case of four first points defined by the positioning pieces 7, 9 and 10 held resting on the resting pieces 15, 16, 19 and 20.

As in all known connecting systems with zero degree of freedom, any urging of the movable part against the spring 21, for instance by the measurement tip 5 coming into contact with an object to be measured, has the effect of causing at least one interruption in contact out of six between positioning pieces and resting pieces. The displacement of the movable part against its spring occurs by external forces applied to the movable part from any azimuth.

Electrical means are provided in order to detect this interruption for the aforementioned purposes of triggering the taking of a measurement and/or automatically stopping the displacement of the feeler.

Figure 2:
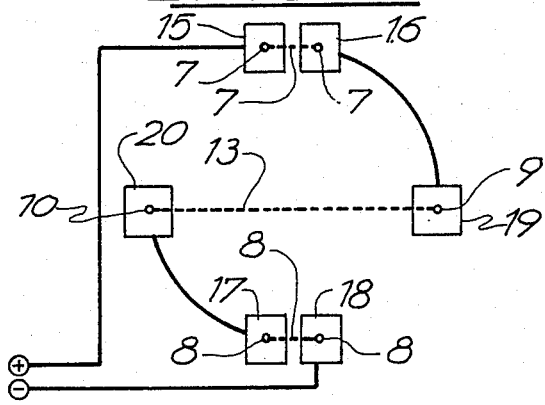
FIG. 2 is a wiring diagram of its contact-interruption detection circuit.

An example of an electric detection circuit for this interruption of contact is given in the diagram of FIG. 2.

In that diagram the contact surfaces of the resting pieces 15 to 20 have been represented by rectangles, the contact points of the positioning pieces 7 to 10 with the resting pieces 15–20 by dots, the electric connections made by the pieces 7–10 themselves by dash lines and the connections between the resting pieces 15 to 20 by solid lines. The connections between the resting pieces may constitute, for instance, a printed circuit, not shown, associated with the dielectric bottom 3 of the housing 1 and connected to the + and − terminals of a feed circuit.

The positioning pieces 7 to 10 and the rest pieces 15 to 20 constitute the equivalent, at their points of contact, of six switches connected in series in a contact-break circuit connecting the + and − terminals. When the movable support is resting via its six contact points on the stationary support, there is a short circuit.

Any relative movement between the two supports can thus be detected by the opening of this circuit.

This circuit is obviously not limitative and the same effect can be obtained by other connections, such as, for instance, with a circuit in which the resting pieces 15 and 20, 18 and 19 as well as the positioning pieces 7 and 9 are connected to each other.

With regard to the distribution and the geometry of the positioning and resting pieces, other embodiments, not shown, are also possible.

Thus, the distribution of these pieces can be reversed. The resting pieces 15 to 20 are mounted on the movable support 4 or on a disk integral with the support 4. The positioning pieces 7 to 10 are mounted on the base 3 of the stationary support 1.

Thus, furthermore, in place of the spherical-flat contact between positioning pieces and rest pieces, the same effects can be obtained by spherical-spherical, spherical-cylindrical or spherical-conical contact, the important thing being that in each case there is only a single point of contact between these pieces. It is also possible to obtain the same effects by cylinder-cylinder and cylinder-cone contact, but here, however, only provided that the axes of revolution are not parallel.

The second embodiment shown in FIG. 3 has been adopted for the simplicity and reliability of its design as well as to illustrate a combined system of spherical-cylindrical and spherical-spherical contacts.

In this second embodiment, the parts which have not been changed as compared with the first embodiment bear the same reference numbers, such as the stationary support 1, the hub and the 4 X-arms 11 to 14 of the movable support 4, the measurement tip 5-6 and the compression spring 21.

Likewise, the geometrical distribution of the positioning and resting pieces remains unchanged; only the geometry of their contact surfaces is different, for which reason these parts bear the same reference number, provided with the suffix "a".

Of the four positioning pieces 7a to 10a, three pieces 8a, 9a and 10a have a cylindrical contact surface and the fourth piece 7a has a spherical contact surface. The six resting pieces 15a to 20a have a spherical contact surface and are formed here by balls which are positioned and fastened by partial embedment in the bottom 3a of the stationary support 1.

These positioning and resting pieces are arranged in such a manner that the fictitious planes of tangency drawn at the six points of contact between them, which are represented by parallelograms shown in thin dashed lines marked T on the drawing, are confined and oriented in a manner identical to the flat contact surfaces of the corresponding resting pieces 15 to 20 of the first embodiment, shown in FIG. 1, and their size has intentionally been made identical to that of these flat contact surfaces in order clearly to show the similarity between these fictitious and concrete planes.

In this arrangement, the fourth positioning piece 7a with a spherical contact surface is in contact with one of the first two pairs of resting pieces 15a, 16a. The line of intersection of their fictitious planes of tangency T is oblique with respect to the second plane $P_2$, as in the arrangement of the first embodiment.

In this way, the second embodiment functions in a manner similar to the first embodiment, with the difference, however, that the similarity between the orientation of the fictitious tangency planes and the actual contact planes stops as soon as there is movement between the two supports 1 and 4 due to the curvature of the contact surfaces of the resting pieces 15a to 20a.

In the variant of this second embodiment shown in FIG. 4, the contact surface of the fourth positioning piece 7b is conical instead of spherical as in the case of the part 7a, which represents a further structural simplification since all the parts with spherical contact surface of this variant can be formed by balls.

The application of the feeler to the machines for the three-dimensional measuring of an object is obviously not limitative and the invention can also be applied with its advantages, to all multidirection contact systems such as those used in the automatic controls of machine tools, the end-of-stroke switches, or the miscellaneous stops for which a precise and sensitive response is desired.

I claim:

1. A sensor for an omnidirectional contactor system, said sensor comprising:
   a stationary support;
   a movable support having a tip, and being movable relative to the stationary support;
   a positioning device intermediate the stationary and movable supports, said positioning device comprising first through fourth positioning pieces connected to a selected one of the movable and stationary supports and spaced about a central axis, the first and second positioning pieces being separated by 180° about the central axis and the third and fourth positioning pieces being separated by 180° about the central axis, said positioning device further comprising first through sixth resting pieces connected to the other of the mobable and stationary supports, the first and second resting pieces being disposed to contact the first positioning piece at two points of contact thereon defining first and second angularly aligned planes of tangency respectively, the third and fourth resting pieces being disposed to contact the second positioning piece at two points of contact defining third and fourth angularly aligned planes of tangency respectively, the fifth resting piece being disposed to contact the third positioning piece at a point of contact defining a fifth plane of tangency, and the sixth resting piece being disposed to contact the fourth positioning piece at a point of contact defining a sixth plane of tangency, said positioning pieces and said resting pieces being disposed and configured such that said movable and stationary supports are translatable and pivotable relative to one another in a first plane which passes symmetrically through said first and second positioning pieces and said central axis, while maintaining said first and second positioning pieces in contact with said first through fourth resting pieces respectively; and
   spring means disposed intermediate the movable and stationary supports for urging the first through fourth positioning pieces into contact with the respective first through sixth resting pieces.

2. A sensor as in claim 1 wherein the first through fourth positioning pieces are symmetrically disposed in a second plane, said first and second opposed positioning pieces being spaced from said second and third positioning pieces by 90° in said second plane.

3. A sensor as in claim 2 wherein the first and second planes of tangency intersect at a first line of intersection and wherein said third and fourth planes of tangency intersect at a second line of intersection, said first and second lines of intersection being convergent and being in said first plane, the first line of intersection being oblique to the second plane, and the second line of intersection being parallel to the second plane.

4. A sensor as in claim 3 wherein the third and fourth positioning pieces and the fifth and sixth resting pieces are configured such that the fifth and sixth planes of tangency are parallel to one another and are oblique to the second plane.

5. A sensor as in claim 4 wherein the first through sixth resting pieces have planar contact surfaces and wherein the first through fourth positioning pieces have spherical contact surfaces for contacting the planar surfaces of said resting pieces such that the first through sixth planes of tangency are defined by the respective planar contact surfaces of said first through sixth resting pieces.

6. A sensor as in claim 4 wherein said first through sixth resting pieces define spherical contact surfaces, said first positioning piece defining a spherical contact surface for contacting the first and second resting pieces respectively, said second through fourth positioning pieces defining cylindrical contact surfaces.

7. A sensor as in claim 4 wherein said first through sixth resting pieces define spherical contact surfaces, said first positioning piece defining a conical contact surface for contacting the first and second resting pieces respectively, said second through fourth positioning pieces defining cylindrical contact surfaces.

* * * * *